US012789555B2

(12) United States Patent
Yonemoto

(10) Patent No.: US 12,789,555 B2
(45) Date of Patent: Nov. 10, 2026

(54) SHEET PROCESSING APPARATUS

(71) Applicant: KYOCERA Document Solutions Inc., Osaka (JP)

(72) Inventor: Satoru Yonemoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 96 days.

(21) Appl. No.: 19/092,652

(22) Filed: Mar. 27, 2025

(65) Prior Publication Data

US 2025/0303764 A1 Oct. 2, 2025

(30) Foreign Application Priority Data

Mar. 28, 2024 (JP) ................................ 2024-053629

(51) Int. Cl.

| | |
|---|---|
| ***B60B 33/04*** | (2006.01) |
| ***B60B 33/00*** | (2006.01) |
| *B41J 29/02* | (2006.01) |
| *G03G 21/16* | (2006.01) |

(52) U.S. Cl.

CPC .......... *B60B 33/04* (2013.01); *B60B 33/0005* (2013.01); *B60B 33/0007* (2013.01); *B60B 33/0021* (2013.01); *B41J 29/02* (2013.01); *B60B 2200/43* (2013.01); *G03G 21/1619* (2013.01)

(58) Field of Classification Search

CPC . B60B 33/04; B60B 33/0005; B60B 33/0007; B60B 33/0021; B60B 33/0026; B60B 33/063; B41J 29/02; G03G 21/1619

See application file for complete search history.

(56) References Cited

U.S. PATENT DOCUMENTS 554,832 A * 2/1896 Partridge ................ B60B 33/04 16/19
745,107 A * 11/1903 Kade .................. B60B 33/0007 126/306

(Continued)

FOREIGN PATENT DOCUMENTS

| | | |
|---|---|---|
| JP | 2009175350 A | 8/2009 |
| JP | 2015184393 A | 10/2015 |
| JP | 7331561 B2 | 8/2023 |

OTHER PUBLICATIONS

European Patent Office, Extended European Search Report Issued in Application No. 25165578.3, Aug. 13, 2025, Germany, 9 pages.

*Primary Examiner* — Jeffrey O'Brien
(74) *Attorney, Agent, or Firm* — Alleman Hall LLP

(57) ABSTRACT

A base member includes a first through-hole. A first nut is fixed to an upper portion of the base member and includes a first screw hole that is in communication with the first through-hole. A coupling member is coupled to the base member in a state where the first nut is sandwiched between the coupling member and the base member and includes a second through-hole that is in communication with the first screw hole. A bolt portion of a support leg member is fit into the first screw hole while being inserted into the first through-hole, the first screw hole, and the second through-hole. A second nut is fastened to a portion of the bolt portion that protrudes upwardly from the second through-hole, to fix the bolt portion to the coupling member as well as sandwich the coupling member between the second nut and the first nut.

4 Claims, 5 Drawing Sheets

(56) References Cited

U.S. PATENT DOCUMENTS

| | | | | | |
|---|---|---|---|---|---|
| 2,425,675 | A * | 8/1947 | Graff | B60B 33/04 | 16/19 |
| 3,437,346 | A * | 4/1969 | Cobb | B60B 33/04 | 280/43.2 |
| 5,558,027 | A * | 9/1996 | Williams | B60B 33/0063 | 109/47 |
| 5,745,951 | A * | 5/1998 | Waner | B60B 33/021 | 16/31 R |
| 6,082,272 | A * | 7/2000 | Adrain | E05G 1/005 | 109/51 |
| 6,109,625 | A * | 8/2000 | Hewitt | F16M 11/18 | 280/43.24 |
| 6,899,345 | B1 * | 5/2005 | Bearden | B60B 33/0057 | 280/43 |
| 7,350,269 | B2 * | 4/2008 | Dominic | B60B 33/0002 | 16/30 |
| 7,484,728 | B2 * | 2/2009 | Yonemoto | B65H 1/04 | 271/145 |
| 7,571,887 | B2 * | 8/2009 | Finkelstein | F16M 7/00 | 248/656 |
| 9,623,704 | B2 * | 4/2017 | Harada | G03G 21/1619 | |
| 9,630,798 | B2 * | 4/2017 | Akagawa | B65H 1/28 | |
| 2003/0041409 | A1 * | 3/2003 | Caporale | B60B 33/0021 | 16/19 |
| 2003/0061681 | A1 * | 4/2003 | Plate | B60B 33/0002 | 16/19 |
| 2004/0237251 | A1 * | 12/2004 | Kang | B60B 33/0002 | 16/45 |
| 2008/0172829 | A1 * | 7/2008 | White | B60B 33/0063 | 16/29 |

* cited by examiner

SHEET PROCESSING APPARATUS

INCORPORATION BY REFERENCE

This application is based upon and claims the benefit of priority from the corresponding Japanese Patent Application No. 2024-053629 filed on Mar. 28, 2024, the entire contents of which are incorporated herein by reference.

BACKGROUND

The present disclosure relates to a sheet processing apparatus which is arranged next to an image forming apparatus and is capable of adjusting a height.

The sheet processing apparatus is arranged next to an image forming apparatus and executes sheet processing on sheets delivered from the image forming apparatus. For example, the sheet processing is punching processing, stapling processing, sheet folding processing, or the like.

The sheet processing apparatus includes, at a plurality of positions at a lower end portion of a main body of the sheet processing apparatus, a plurality of main body support portions that support the main body. Each of the main body support portions includes a height adjustment mechanism. The height adjustment mechanism is a mechanism for adjusting a height of a sheet inlet of the sheet processing apparatus with respect to a sheet outlet of the image forming apparatus.

For example, it is known that in the sheet processing apparatus, a bolt portion that constitutes a support axis of a caster is inserted into a hole of a plate portion fixed to the lower end portion of the main body, and two nuts are fastened to the bolt portion so as to sandwich the plate portion.

The height of the sheet processing apparatus is adjusted by adjusting the fastening positions of the two nuts on the bolt portion of the caster.

SUMMARY

A sheet processing apparatus according to an aspect of the present disclosure includes a main body and a plurality of main body support portions. The main body is arranged next to an image forming apparatus and incorporates therein a device which processes a sheet delivered from the image forming apparatus. The plurality of main body support portions support the main body at a plurality of positions at a lower end portion of the main body. Each of the main body support portions includes a base member, a first nut, a coupling member, a support leg member, and a second nut. The base member is fixed to the lower end portion of the main body and includes a first through-hole penetrating in an up-down direction. The first nut is fixed to an upper portion of the base member and includes a first screw hole that is in communication with the first through-hole along the up-down direction. The coupling member is coupled to the base member in a state where the first nut is sandwiched between the coupling member and the base member and includes a second through-hole that is in communication with the first screw hole along the up-down direction. The support leg member includes a bolt portion fit into the first screw hole while being inserted into the first through-hole, the first screw hole, and the second through-hole and a leg portion that protrudes downwardly from the bolt portion and comes into contact with an installation surface, and supports the main body via the first nut and the base member. The second nut includes a second screw hole into which the bolt portion is fit, and is fastened to a portion of the bolt portion that protrudes upwardly from the second through-hole, to fix the bolt portion to the coupling member as well as sandwich the coupling member between the second nut and the first nut.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

A sheet processing apparatus 2 according to the embodiment configures a part of an image forming system 10.

Configuration of Image Forming System 10

Figure 1:
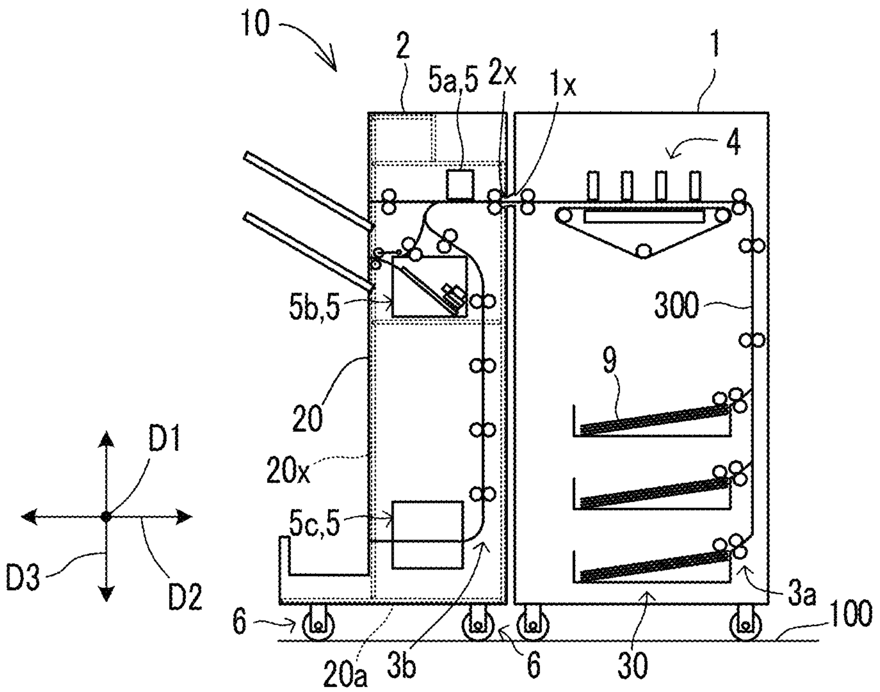
FIG. 1 is a configuration diagram of an image forming system including a sheet processing apparatus according to an embodiment.

The image forming system 10 includes an image forming apparatus 1 and the sheet processing apparatus 2 arranged next to the image forming apparatus 1 (see FIG. 1).

In the respective figures, a depth direction D1 is a front-rear direction of the sheet processing apparatus 2, and a width direction D2 is a left-right direction of the sheet processing apparatus 2. Further, a longitudinal direction D3 is an up-down direction.

The image forming apparatus 1 and the sheet processing apparatus 2 are arranged next to each other in the width direction D2. A front direction F and a rear direction R of the sheet processing apparatus 2 are directions along the depth direction D1.

The image forming apparatus 1 includes a first sheet conveying device 3*a* and a printing device 4. The first sheet conveying device 3*a* feeds a sheet 9 from a sheet storing portion 30, and further conveys the sheet 9 within the image forming apparatus 1. The printing device 4 forms an image on the sheet 9 conveyed by the first sheet conveying device 3*a*.

In the example shown in FIG. 1, the printing device 4 forms an image on the sheet 9 by an inkjet method. It is noted that the printing device 4 may alternatively be a device that forms an image on the sheet 9 by other methods such as electrophotography.

The first sheet conveying device 3*a* conveys the sheet 9 on which the image has been formed to a sheet inlet 2*x* of the sheet processing apparatus 2 via a sheet outlet 1*x* of the image forming apparatus 1.

The sheet processing apparatus 2 executes various types of sheet processing on the sheet 9 delivered from the image forming apparatus 1 via the sheet inlet 2*x*. The sheet processing apparatus 2 includes a main body 20, a second sheet conveying device 3*b*, and one or more sheet processing mechanisms 5.

The main body 20 is a housing which incorporates therein the second sheet conveying device 3*b* and the one or more sheet processing mechanisms 5.

The second sheet conveying device 3*b* conveys the sheet 9 delivered from the image forming apparatus 1 inside the main body 20. In the example shown in FIG. 1, the sheet processing apparatus 2 includes a plurality of sheet processing mechanisms 5.

The plurality of sheet processing mechanisms 5 include a punching mechanism 5*a*, a stapling mechanism 5*b*, and a sheet folding mechanism 5*c*. The punching mechanism 5*a* punches punch holes on the sheets 9. The stapling mechanism 5*b* executes stapling processing for stapling the plurality of sheets 9. The sheet folding mechanism 5*c* executes sheet folding processing for folding the sheets 9.

The sheet processing apparatus 2 includes a plurality of main body support portions 6 that support the main body 20 at a plurality of positions at a lower end portion of the main body 20. Each of the main body support portions 6 includes a height adjustment mechanism. The height adjustment mechanism is a mechanism for adjusting a height of the sheet inlet 2*x* of the sheet processing apparatus 2 with respect to the sheet outlet 1*x* of the image forming apparatus 1.

Figure 2:
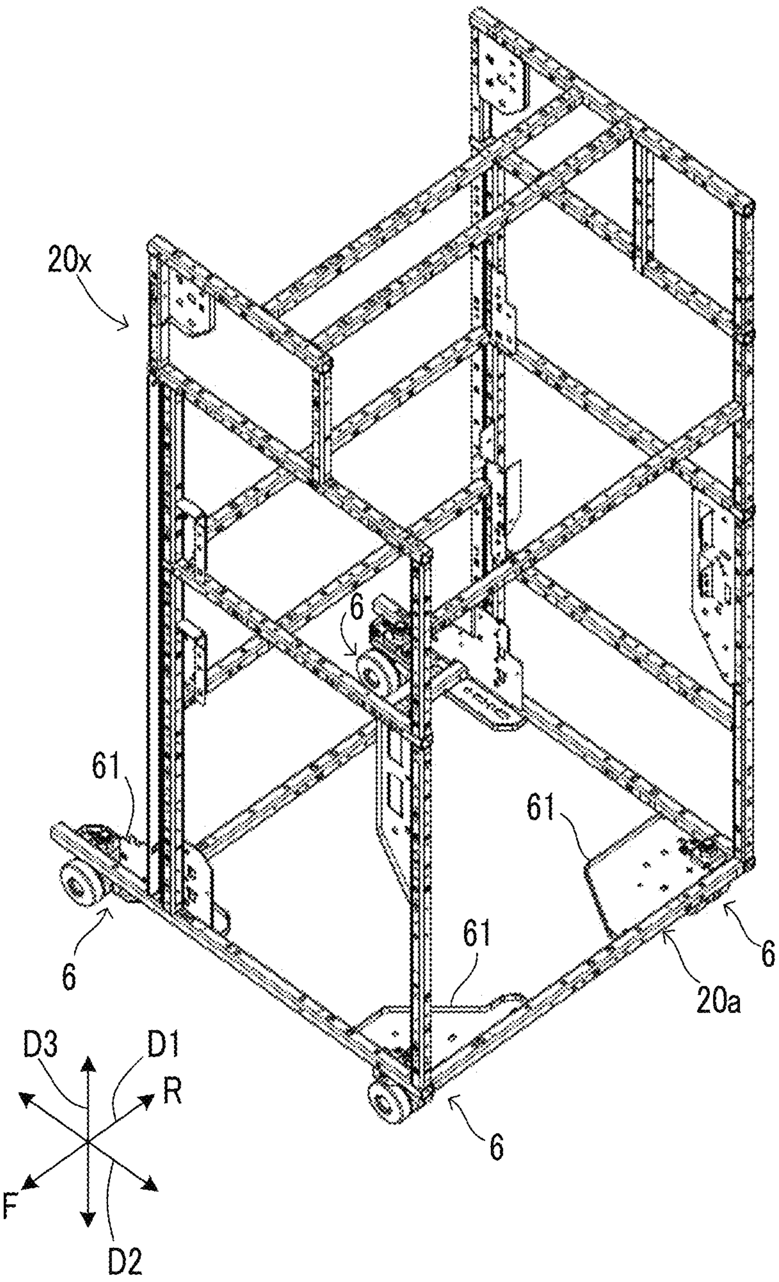
FIG. 2 is a perspective view of a main body frame and a plurality of main body support portions in the sheet processing apparatus according to the embodiment.

The main body 20 of the sheet processing apparatus 2 includes a main body frame 20*x* constituted of a plurality of joined metal pipes (see FIG. 1 and FIG. 2). In the present embodiment, the main body frame 20*x* is constituted of a plurality of square metal pipes joined by welding.

In descriptions below, the lower end portion of the main body frame 20*x* will be referred to as a lower frame 20*a* (see FIG. 1 and FIG. 2). In the present embodiment, four main body support portions 6 are respectively attached at four corners of the lower frame 20*a* (see FIG. 2).

Incidentally, in each of the main body support portions 6, when a bolt portion 621 of a support body is inserted into a hole of a plate portion and two nuts are fastened to the bolt portion 621 so as to sandwich the plate portion, a load of the main body 20 is concentrated at an edge portion of the hole in the plate portion.

When the load of the main body 20 is concentrated at one point of the plate portion, the plate portion is apt to be deformed. Meanwhile, it is not favorable to adopt a special member having high strength because this leads to an increase in costs.

In the present embodiment, each of the main body support portions 6 realizes a mechanism for adjusting the height of the main body 20 while suppressing costs. Hereinafter, the configuration of each of the main body support portions 6 will be described.

Figure 3:
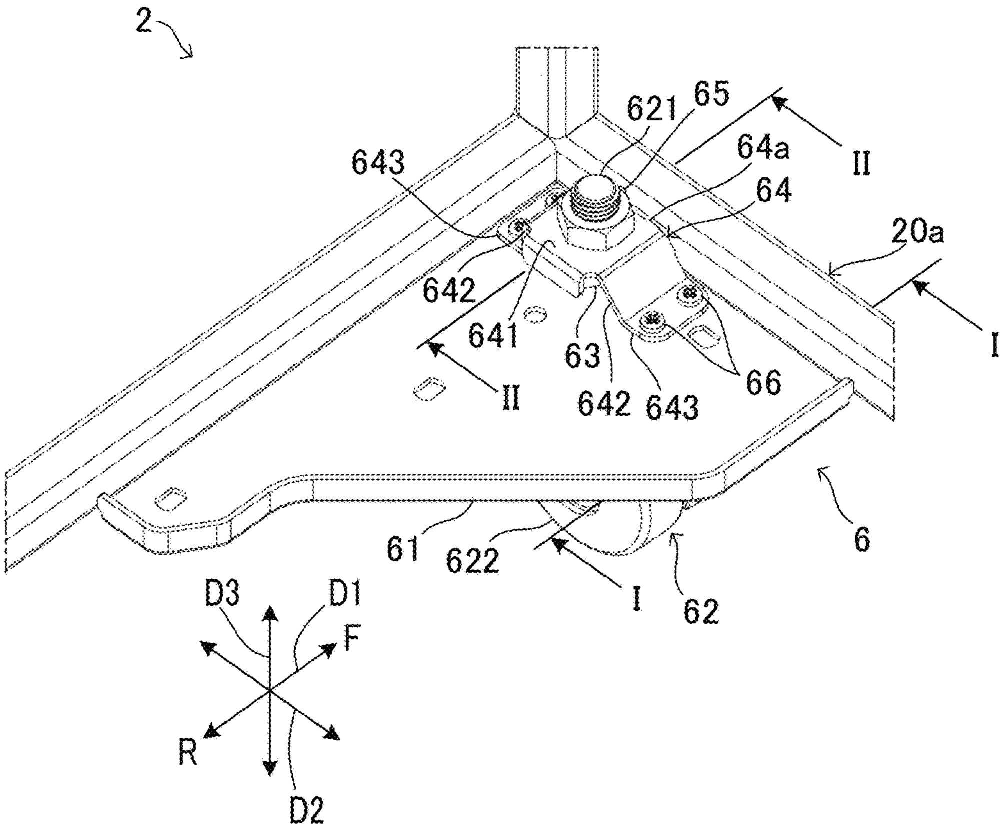
FIG. 3 is a perspective view of one of the plurality of main body support portions in the sheet processing apparatus according to the embodiment.
Figure 4:
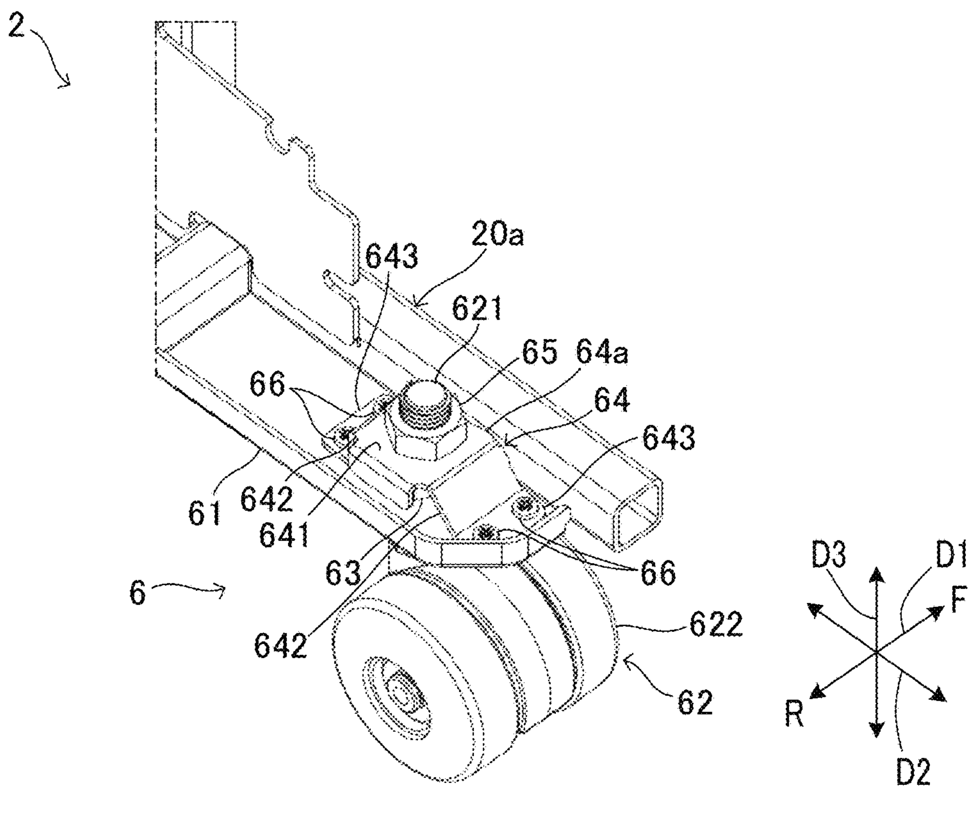
FIG. 4 is a perspective view of another one of the plurality of main body support portions in the sheet processing apparatus according to the embodiment.

FIG. 3 is a perspective view of one of the four main body support portions 6 that is arranged at a right end portion of a front end portion of the lower frame 20*a*. FIG. 4 is a perspective view of one of the four main body support portions 6 that is arranged at a left end portion of the front end portion of the lower frame 20*a*.

Figure 5:
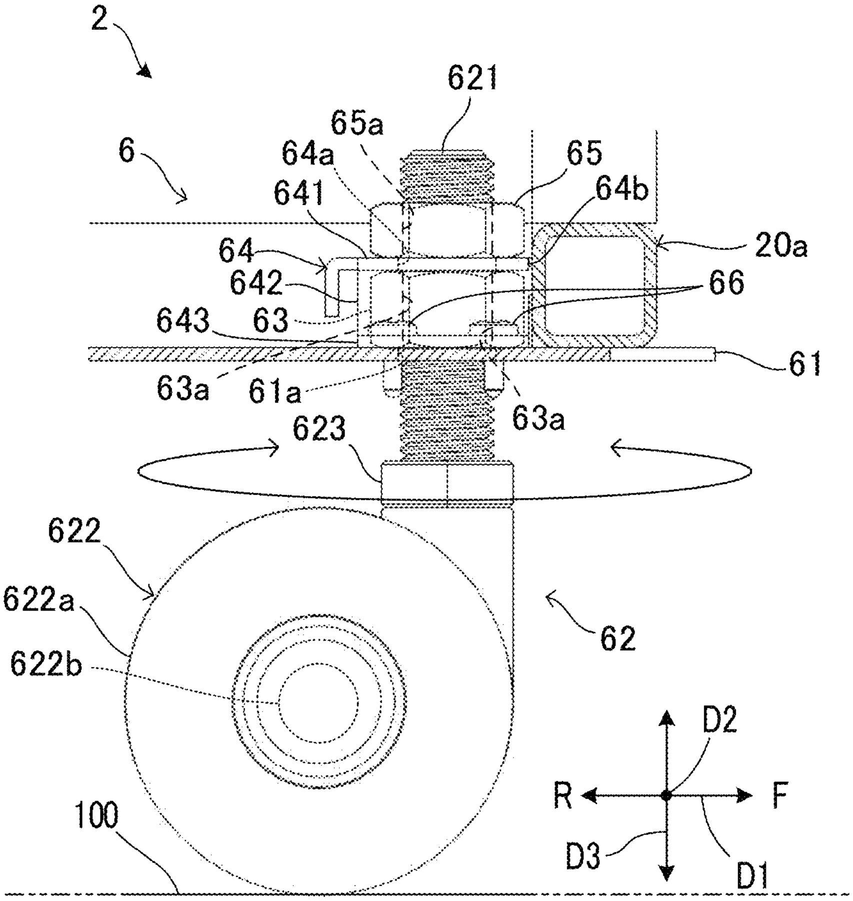
FIG. 5 is a first cross-sectional side view of one of the plurality of main body support portions in the sheet processing apparatus according to the embodiment.
Figure 6:
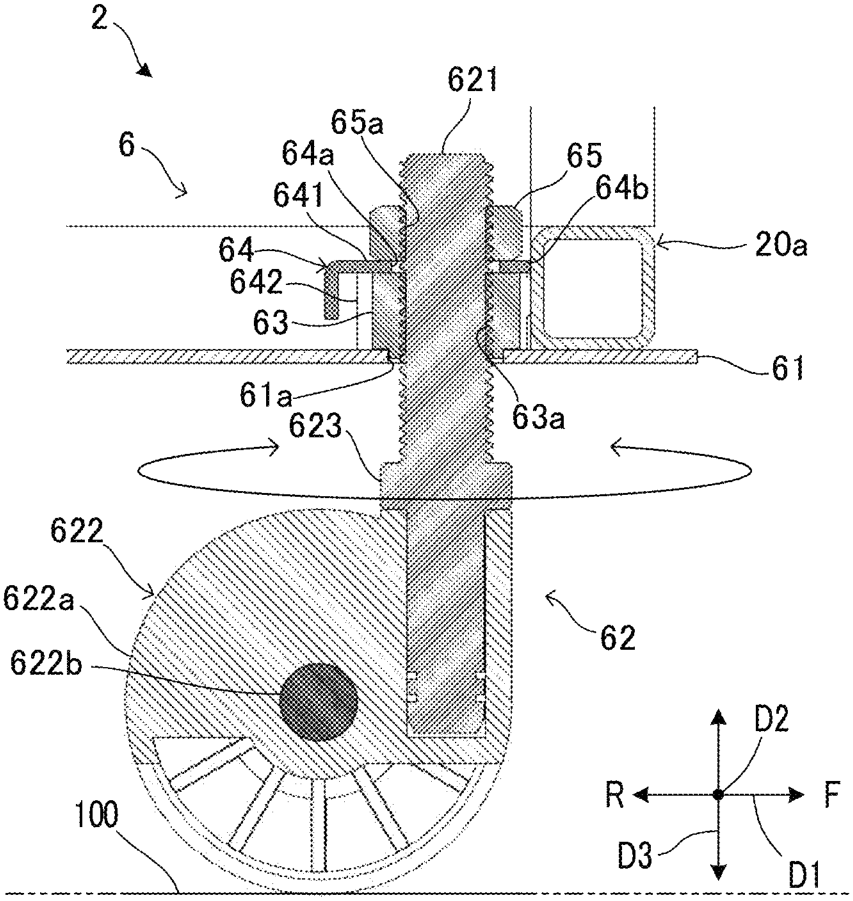
FIG. 6 is a second cross-sectional side view of one of the plurality of main body support portions in the sheet processing apparatus according to the embodiment.

FIG. 5 shows a cross section of the main body support portion 6 shown in FIG. 3 taken along the line I-I. FIG. 6 shows a cross section of the main body support portion 6 shown in FIG. 3 taken along the line II-II.

Each of the main body support portions 6 includes a base member 61, a support leg member 62, a first nut 63, a coupling member 64, and a second nut 65 (see FIG. 3 to FIG. 5).

The base member 61 is fixed to the lower end portion of the main body 20. In the present embodiment, the base member 61 is a sheet metal member welded to the lower frame 20*a*. The base member 61 includes a first through-hole 61*a* penetrating in the longitudinal direction D3 (see FIG. 5 and FIG. 6).

The base member 61 shown in FIG. 3 and the base member 61 shown in FIG. 4 are members that have different shapes but have the same function. It is noted that the base member 61 may be fixed to the lower frame 20*a* by a bolt, a nut, and the like.

The first nut 63 is fixed to an upper portion of the base member 61. The first nut 63 includes a first screw hole 63*a* that is in communication with the first through-hole 61*a* along the longitudinal direction D3. That is, the first nut 63 is fixed to the upper portion of the base member 61 such that the first screw hole 63*a* of the first nut 63 communicates with the first through-hole 61*a*.

In the present embodiment, the first through-hole 61*a* is formed in a plate-like portion of the base member 61, and the first nut 63 is welded on an upper surface of a portion of the base member 61 where the first through-hole 61*a* is formed.

The coupling member 64 is coupled to the base member 61 in a state where the first nut 63 is sandwiched between the coupling member 64 and the base member 61 (see FIG. 3 to FIG. 6). The coupling member 64 includes a second through-hole 64*a* that is in communication with the first screw hole 63*a* along the longitudinal direction D3 (see FIG. 5 and FIG. 6).

In the present embodiment, the coupling member 64 is a sheet metal member that is coupled to the base member 61 by a plurality of screws 66. The coupling member 64 includes an upper plate portion 641, a plurality of hanging portions 642, and a plurality of to-be-fixed portions 643 (see FIG. 3 to FIG. 6).

The upper plate portion 641 is in contact with an upper surface of the first nut 63. The second through-hole 64*a* is formed in the upper plate portion 641.

The plurality of hanging portions 642 are connected to the upper plate portion 641 and hang down from the upper plate portion 641 toward the upper surface of the base member 61. The plurality of to-be-fixed portions 643 are respectively connected to the plurality of hanging portions 642 and are formed to respectively extend from the plurality of hanging portions 642 along the upper surface of the base member 61. The plurality of to-be-fixed portions 643 are fixed to the base member 61 by the plurality of screws 66 (see FIG. 3 and FIG. 4).

The support leg member 62 includes the bolt portion 621 and a caster 622 (see FIG. 5 and FIG. 6). The bolt portion

621 is inserted into the first through-hole 61*a* of the base member 61, the first screw hole 63*a* of the first nut 63, and the second through-hole 64*a* of the coupling member 64.

The bolt portion 621 is fit into the first screw hole 63*a* while being inserted into the first through-hole 61*a*, the first screw hole 63*a*, and the second through-hole 64*a*. In other words, the bolt portion 621 is screwed into the first screw hole 63*a* of the first nut 63.

The caster 622 protrudes downwardly from the bolt portion 621 and comes into contact with an installation surface 100. The caster 622 includes a wheel 622*a* and a support shaft 622*b* that rotatably supports the wheel 622*a* (see FIG. 5 and FIG. 6).

The caster 622 is an example of a leg portion. The support leg member 62 supports the main body 20 via the first nut 63 and the base member 61.

It is noted that the support leg member 62 may include a support seat instead of the caster 622. The support seat is a member that protrudes downwardly from the bolt portion 621 and is rotatably coupled to the bolt portion 621.

The second nut 65 includes a second screw hole 65*a* into which the bolt portion 621 of the support leg member 62 is fit (see FIG. 5 and FIG. 6).

The second nut 65 is fastened to a portion of the bolt portion 621 protruding upwardly from the second through-hole 64*a*, to thus fix the bolt portion 621 to the coupling member 64 as well as sandwich the coupling member 64 between the second nut 65 and the first nut 63 (see FIG. 5 and FIG. 6).

By turning the bolt portion 621 in a state where the second nut 65 is loosened, the position of the support leg member 62 in the longitudinal direction D3 with respect to the base member 61 is adjusted. The position of the support leg member 62 in the longitudinal direction D3 is adjusted upwardly or downwardly according to the rotation direction of the bolt portion 621.

After the position of the support leg member 62 is adjusted, the second nut 65 is fastened to the portion of the bolt portion 621 protruding upwardly from the second through-hole 64*a*. The second nut 65 is fastened such that the coupling member 64 is sandwiched between the second nut 65 and the first nut 63.

By fastening the second nut 65 to the bolt portion 621, the rotation of the bolt portion 621 with respect to the first nut 63 is restricted, and the position of the support leg member 62 in the longitudinal direction D3 with respect to the base member 61 is fixed.

In the present embodiment, the bolt portion 621, the first nut 63, the coupling member 64, the second nut 65, and the plurality of screws 66 constitute the height adjustment mechanism.

In the present embodiment, the support leg member 62 includes a polygonal flange portion 623 fixed to the bolt portion 621. The polygonal flange portion 623 includes a polygonal outline surface. For example, the polygonal flange portion 623 is a hexagonal flange.

A tool such as a hexagonal wrench is fit to the polygonal flange portion 623, and the bolt portion 621 is turned using the tool.

In each of the main body support portions 6, the load of the main body 20 is applied to the bolt portion 621 via the first nut 63, the second nut 65, and the coupling member 64.

More specifically, a part of the load of the main body 20 is applied to the bolt portion 621 from a portion of the base member 61 that comes into contact with the plurality of to-be-fixed portions 643 via the coupling member 64 and the second nut 65.

Another part of the load of the main body 20 is applied to the bolt portion 621 from an edge portion of the first through-hole 61*a* in the base member 61 via the first nut 63.

By adopting the main body support portions 6, the load of the main body 20 is distributed to a plurality of positions as described above. Therefore, there is no need to adopt a special member having high strength. As a result, the height adjustment mechanism can be realized while suppressing costs.

In the present embodiment, the caster 622 is coupled to the bolt portion 621 while being capable of revolving about the bolt portion 621 (see FIG. 5 and FIG. 6). Therefore, the support shaft 622*b* of the caster 622 is arranged at a position deviated from an extension of the bolt portion 621.

In each of the main body support portions 6, a force that the wheel 622*a* receives from the installation surface 100 acts on the bolt portion 621 as a moment that is centered on the portion of the bolt portion 621 that comes into contact with the first nut 63 and the second nut 65.

The moment acts as a force that tilts the bolt portion 621 and the coupling member 64 to a side opposite to a side on which the wheel 622*a* is positioned with respect to the bolt portion 621.

The coupling member 64 is coupled to the base member 61 in a state where a side end surface 64*b* of the coupling member 64 is provided along the lower frame 20*a* (see FIG. 5 and FIG. 6).

In descriptions below, the main body support portions provided at the end portion of the main body 20 in the front direction F out of the plurality of main body support portions 6 will be referred to as front main body support portions. On the other hand, the main body support portions provided at the end portion of the main body 20 in the rear direction R out of the plurality of main body support portions 6 will be referred to as rear main body support portions.

FIG. 3 and FIG. 4 are each a perspective view of the main body support portion.

In general, when the sheet processing apparatus 2 is used, the caster 622 is arranged on the rear direction R side with respect to the bolt portion 621 in each of the front main body support portions. Therefore, the moment acts as a force that tilts the bolt portion 621 and the coupling member 64 in the front direction F.

In each of the front main body support portions, the coupling member 64 is coupled to the base member 61 in a state where the side end surface 64*b* of the coupling member 64 in the forward direction F is provided along the lower frame 20*a* (see FIG. 3 and FIG. 4). Meanwhile, in each of the rear main body support portions, the coupling member 64 is coupled to the base member 61 in a state where the side end surface 64*b* of the coupling member 64 in the rear direction R is provided along the lower frame 20*a*.

In each of the main body support portions 6, the lower frame 20*a* acts as a reinforcement portion that prevents the bolt portion 621 and the coupling member 64 from tilting due to the moment.

Notes of Disclosure

Hereinafter, a general outline of the disclosure extracted from the embodiment described above will be noted. It is noted that the respective configurations and processing functions described in the notes below can be sorted and arbitrarily combined as appropriate.

Note 1

A sheet processing apparatus, including:

a main body which is arranged next to an image forming apparatus and incorporates therein a device which processes a sheet delivered from the image forming apparatus; and a plurality of main body support portions which support the main body at a plurality of positions at a lower end portion of the main body, in which each of the main body support portions includes a base member which is fixed to the lower end portion of the main body and includes a first through-hole penetrating in an up-down direction, a first nut which is fixed to an upper portion of the base member and includes a first screw hole that is in communication with the first through-hole along the up-down direction, a coupling member which is coupled to the base member in a state where the first nut is sandwiched between the coupling member and the base member and includes a second through-hole that is in communication with the first screw hole along the up-down direction, a support leg member which includes a bolt portion fit into the first screw hole while being inserted into the first through-hole, the first screw hole, and the second through-hole and a leg portion that protrudes downwardly from the bolt portion and comes into contact with an installation surface, and supports the main body via the first nut and the base member, and a second nut which includes a second screw hole into which the bolt portion is fit, and is fastened to a portion of the bolt portion that protrudes upwardly from the second through-hole, to fix the bolt portion to the coupling member as well as sandwich the coupling member between the second nut and the first nut.

Note 2

The sheet processing apparatus according to note 1, in which the leg portion is a caster including a wheel that comes into contact with the installation surface.

Note 3

The sheet processing apparatus according to note 2, in which the caster is coupled to the bolt portion while being capable of revolving about the bolt portion.

Note 4

The sheet processing apparatus according to note 3, in which the coupling member is coupled to the base member in a state where a side end surface of the coupling member is provided along a part of a frame of the main body.

Note 5

The sheet processing apparatus according to any one of notes 1 to 4, in which the coupling member includes an upper plate portion which comes into contact with an upper surface of the first nut, a plurality of hanging portions hanging from the upper plate portion toward an upper surface of the base member, and a plurality of to-be-fixed portions which are formed to extend from the plurality of hanging portions along the upper surface of the base member and are fixed to the base member.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet processing apparatus, comprising:

a main body which is arranged next to an image forming apparatus and incorporates therein a device which processes a sheet delivered from the image forming apparatus; and a plurality of main body support portions which support the main body at a plurality of positions at a lower end portion of the main body, wherein each of the main body support portions includes a base member which is fixed to the lower end portion of the main body and includes a first through-hole penetrating in an up-down direction, a first nut which is welded on an upper surface of the base member and includes a first screw hole that is in communication with the first through-hole along the up-down direction, a coupling member which is coupled to the base member in a state where the first nut is sandwiched between the coupling member and the base member and includes a second through-hole that is in communication with the first screw hole along the up-down direction, a support leg member which includes a bolt portion fit into the first screw hole while being inserted into the first through-hole, the first screw hole, and the second through-hole and a leg portion that protrudes downwardly from the bolt portion and comes into contact with an installation surface, and supports the main body via the first nut and the base member, and a second nut which includes a second screw hole into which the bolt portion is fit, and is fastened to a portion of the bolt portion that protrudes upwardly from the second through-hole, to fix the bolt portion to the coupling member as well as sandwich the coupling member between the second nut and the first nut, wherein the coupling member includes an upper plate portion which comes into contact with an upper surface of the first nut, and in which the second through-hole is formed, a plurality of hanging portions hanging from the upper plate portion toward the upper surface of the base member, a plurality of to-be-fixed portions which are formed to extend from the plurality of hanging portions along the upper surface of the base member and are fixed to the base member by a plurality of screws, and the second nut sandwiches the upper plate portion between the second nut and the first nut.

2. The sheet processing apparatus according to claim 1, wherein the leg portion is a caster including a wheel that comes into contact with the installation surface.

3. The sheet processing apparatus according to claim 2, wherein the caster is coupled to the bolt portion while being capable of revolving about the bolt portion.

4. The sheet processing apparatus according to claim 3, wherein the coupling member is coupled to the base member in a state where a side end surface of the coupling member is provided along a part of a frame of the main body.

* * * * *